United States Patent [19]

Clyde

[11] 4,306,886

[45] Dec. 22, 1981

[54] MULTIPLE STAGE HIGH TEMPERATURE STRIPPING ZONE IN A HYPERSORPTION PROCESS

[76] Inventor: Berg Clyde, 3655 E. Ocean Blvd., Ste. 2-H, Long Beach, Calif. 90803

[21] Appl. No.: 965,611

[22] Filed: Dec. 1, 1978

[51] Int. Cl.³ .............................................. B01D 53/08
[52] U.S. Cl. .......................................... 55/27; 55/60; 55/79
[58] Field of Search ...................... 55/60, 68, 79, 390, 55/27

[56] References Cited

U.S. PATENT DOCUMENTS

| | | | |
|---|---|---|---|
| 2,616,515 | 11/1952 | Berg | 55/60 |
| 2,616,521 | 11/1952 | Berg | 55/60 |
| 2,630,877 | 3/1953 | Berg | 55/79 |
| 2,638,999 | 5/1953 | Berg | 55/79 |
| 2,688,374 | 9/1954 | Berg | 55/79 |
| 2,780,526 | 2/1957 | Fleck | 55/390 |
| 3,405,507 | 10/1968 | Spencer et al. | 55/62 |
| 3,540,188 | 11/1970 | Barrere, Jr. et al. | 55/62 |

*Primary Examiner*—Robert H. Spitzer
*Attorney, Agent, or Firm*—Fischer, Tachner & Strauss

[57] ABSTRACT

There is disclosed an improvement in a selective adsorption process wherein a gaseous mixture of gas components is separated by contact with a compact, moving bed of particulate adsorbent having a selected adsorbency for one of the gas components which is thermally desorbed therefrom. The process of the invention comprises contacting the hot, thermally desorbed adsorbent with recycle lean gas in a sufficient amount and through a sufficient depth of stripping zone to effect substantially complete desorption of the rich gas component therefrom prior to introduction of the adsorbent into the fractionating zone of the process. The process is particularly useful for the separation of gaseous components which are extremely difficult to separate by cryogenic techniques.

12 Claims, 3 Drawing Figures

MULTIPLE STAGE HIGH TEMPERATURE STRIPPING ZONE IN A HYPERSORPTION PROCESS

BACKGROUND OF THE INVENTION

1. Field of Invention

This invention relates to a selective adsorption process and, in particular relates to a hypersorption process of improved efficiency.

2. Brief Statement of the Prior Art

The hypersorption process comprises contacting of a gaseous mixture of two or more gas components with a compact, moving bed of particulate adsorbent having a preferential adsorbency for one or more of the components of the gaseous mixture. The rich adsorbate from this contacting can be thermally desorbed by contact with a heating fluid such as steam or heated recycle rich product, and the rich product desorbed therefrom is recovered from the process. The commercial installations of which I am aware have employed steam as the heating fluid for this thermal desorbtion, however, in my prior U.S. Pat. No. 2,616,521, I disclosed that a portion of the rich gas product can be heated and recycled to contact the rich adsorbate as the heating gas in the thermal desorbtion zone.

The thermal desorption of the rich adsorbate is only partially effective; only about half of the adsorbed gaseous component can be desorbed in practice and the adsorbent returned to the fractionation zone, therefore, has an undesirably high content of adsorbed gaseous components, reducing the efficiency of the process.

BRIEF STATEMENT OF THE INVENTION

This invention comprises an improvement in a hypersorption process wherein the thermally desorbed adsorbent is passed from the heating zone to a hot stripping zone where it is contacted with recycle lean gas product in a sufficient amount and through a sufficient number of equivalent separation stages to effect substantially complete desorbtion of the gaseous components on the adsorbent. In the preferred embodiment, the hot stripping zone comprises the uppermost zone of a multiple-zone, gravitating, compact bed of the particulate adsorbent. The hot, thermally desorbed adsorbent is removed from the heating zone and passed into a lift zone where it is contacted with a lift gas and elevated to the top of the vessel containing the compact bed. The hot stripping zone is at the top of the vessel, and a mixture of purge gas, which contains the lean gas components used as a stripping gas in the hot stripping zone and the desorbed remaining portion of the rich component desorbed in the hot stripping zone, is removed from the top of the vessel in admixture with the lift gas. The resultant stream is compressed, divided into two streams, one stream is recycled as the lift gas and the second stream is cooled and returned to the fractionating zone at, above or below the level of the feed introduction.

BRIEF DESCRIPTION OF THE DRAWINGS

The invention will be described with reference to the FIGURES, of which.

DESCRIPTION OF PREFERRED EMBODIMENTS

Figures 1, 2, 3:
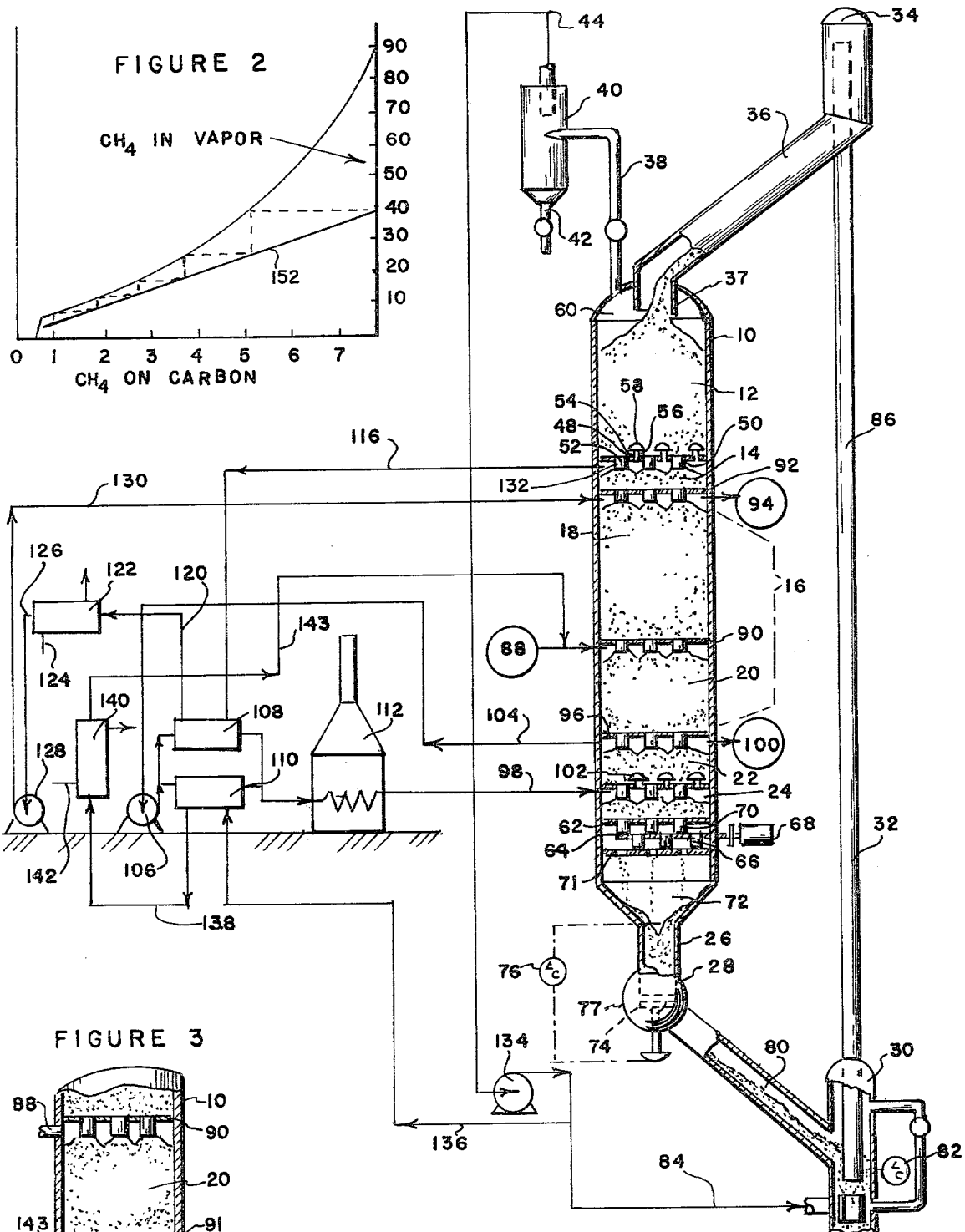
FIG. 1 illustrates a preferred embodiment of the invention.
FIG. 2 is a graphical design calculation of the stripping stages in the preferred embodiment.
FIG. 3 illustrates equipment modification for an alternate embodiment of the invention.

Referring now to FIG. 1, there is illustrated a schematic flow diagram with a vertical cross-section of the adsorbtion vessel employed in the process. The adsorption column 10 has a plurality of superimposed processing zones comprising a hot stripping zone 12, a cooling zone 14, a fractionation zone 16 formed of two fractionation sub-zones 18 and 20, a thermal desorption zone 22 and a solids feeding zone 24.

The adsorbtion vessel 10 is a generally cylindrical, vertical vessel having a height, dependent upon the difficulty of the separation to be effected, from 40 to 100 feet or more. Additionally, although the process in its preferred embodiment is illustrated as being conducted within a single vessel, it is understood that one or several of the processing zones can be contained within distinct and separate vessels which are interconnected by suitable solids mass transfer equipment.

The solids are discharged from the vessel 10 through bottom outlet 26 and flow control valve 28, and are discharged to a lift induction zone 30 where the solids are entrained and lifted by a lift gas through lift zone 32. The solids are discharged into an impactless separator 34 and are transported through conduit 36 to the top of the hot stripping zone 12. The lift gas, which disengages from the solids in the separator 34 is also conveyed into the top of vessel 10 through conduit 36 and is removed therefrom through line 38. The gas is discharged from line 38 into a solids separator 40 such as a cyclone separator where the fine solids are separated from the vapor and discharged through line 42. The vapor is removed from the separator through line 44.

The gas-solid contacting and separation within vessel 10 is effected by a plurality of engaging and disengaging trays. Typically, the trays comprise a flat plate such as plate 48 which is shown at the bottom of the hot stripping zone 12. The plate bears a plurality of apertures 50 which communicate through short tubular conduits 52 that are dependent thereon and that have sufficient diameter to permit free flow of the particulate adsorbent therethrough. The adsorbent level is established beneath a vapor space under tray 48 which can then be used for introduction or removal of the vapor from the treatment zone.

The particular tray 48 is also provided with a second plurality of apertures 54 which receive a second plurality of open-ended conduits 56. Each of the conduits 56 is capped by a bell-shaped cover 58 commonly referred to as a bubble cap in the process industry. These bubble cap trays such as tray 48 thus provide for the introduction of the vapor from beneath tray 48 into the upper hot stripping zone where the gas flows counter-current to the downwardly flowing bed of solid particulate adsorbent and is removed therefrom in the upper region of the zone 12 through conduit 38. Preferably, conduit 36 discharges through a short introduction conduit 37 which provides a vapor space 60 above the bed of solids within vessel 10 and this space is sized sufficiently to effect a substantial elutriation of the solids from the vapor before the vapor is removed through conduit 38.

The solids feeding zone 24 comprises a shallow bed of solids which is maintained above tray 62. Tray 62 is superimposed above a reciprocating tray 64 which has a plurality of open-ended conduits 66 that are reciprocated by motor 68 into and out of axial alignment with the coacting conduits 70 in the tray 62 whereby solids within the feeding zone 24 can be removed therefrom at a rate corresponding to the frequency of reciprocation of the tray 64. The solids are removed from the conduits 66 through the apertures of the subjacent grate tray 71 and fall into the lower extremity 72 of the vessel, substantially filling the reduced diameter neck 26.

Neck 26 discharges against a plate valve member 74 that is moved into and out of seating relationship with the end of the neck 26. The position of valve member 74 is controlled by the level controller 76. The solids are discharged into the collection hopper 77 and flow through an inclined conduit 80 into the lift induction chamber 30. The lift gas is introduced into the lift induction chamber 30 through line 84 at a rate controlled by level controller 82 which maintains an appropriate level of solids within this chamber 30. The lift gas suspends the solid particles and conveys them through the vertical lift zone 32 which is defined by an open-ended conduit 86 into the impactless separator 34. The suspension is broken in the separator 34 and the lift gas and solid adsorbent are both discharged through conduit 36 into vessel 10.

The gaseous feed mixture for separation in the process can comprise a mixture of two or more gas components and is introduced into the vessel 10 through the feed inlet conduit 88 which discharges into the vapor space beneath the feed engaging tray 90. Tray 90 is located within the fractionation zone 16, subdividing this zone into upper and lower sub-zones 18 and 20. The feed contacts the solid adsorbent particles and one of the components of the gas mixture is selectively adsorbed on the particles forming a rich adsorbate which moves downwardly through fractionation sub-bed 20. The less preferentially adsorbed gas of the mixture rises through the fractionation sub-bed 18 and collects beneath the tray 92 from where it is removed through conduit 94 as the lean gas product.

Each of the sub-zones 18 and 20 of the fractionation zone 16 functions as an equivalent number of separation stages and the mixture of the two or more gaseous components is distributed vertically through these sub-beds at substantially equilibrium compositions determined by the selective adsorbency of the adsorbent for these components. Although the feed engaging tray 90 can be located at any preselected level within the fractionation zone 16, it is typically located near the middle of this zone thus forming sub-zones 18 and 20 of substantially equal vertical depth corresponding to an equal number of equivalent separation stages.

The rich adsorbate comprising the preferentially adsorbed component of the gas mixture on the particles of adsorbent is passed from the base of the fractionation zone through tray 96 to the thermal desorption zone 22. The rich adsorbate is heated within zone 22 by counter-current contact with a hot stream of recycle gas introduced through line 98. This heating is sufficient to significantly raise the temperature of the adsorbate and to effect the thermal desorption of the preferentially adsorbed component which collects in the vapor space beneath tray 96 and is removed therefrom through the rich product withdrawal conduit 100. Some of the desorbed rich gas component is internally refluxed through the tower into the base of sub-zone 20 of fractionation zone 16 through the plurality of bubble caps 102 of tray 96. Additionally, a portion of the rich product is removed through line 104, compressed in blower 106, heated in heat exchangers 108 and 110 and further heated in a heater 112 to the necessary elevated temperature to effect the desired degree of thermal desorbtion. This gas is then returned to the vessel 10 as the source of the heating gas introduced through line 98.

As previously mentioned, a difficulty associated with the prior applications of this process of selective adsorption for separation of components of a gaseous mixture is the limit to the degree of adsorption that can be accomplished. Typically, the thermally desorbed adsorbent which exits from the heating stage 22 through tray 62 has up to 50 percent of its capacity satisfied by residual, undesorbed quantities of the selectively adsorbed gas component. This results in significantly increasing the necessary rate of solids circulation to effect separation of the gas components and adversely affects the thermal efficiency of the process.

The present invention comprises passing the thermally desorbed adsorbent into the hot gas stripping zone, which in the preferred embodiment, is the uppermost zone 12 of the adsorption vessel 10. The adsorbent which is introduced into the stripping zone 12 remains at a relatively high temperature following its treatment in the heating zone 12. The adsorbent is contacted in the stripping zone 12 with quantities of the lean product which are passed from the cooling zone 14 through the bubble caps 58 into the base of this zone. The cooling gas which is used for this treatment comprises the lean gas which is removed through line 116 that communicates with the vapor space beneath tray 48. This gas is passed through heat exchanger 108 in indirect heat exchange with the recycle rich gas used for the thermal desorbtion zone 22 and then is passed through conduit 120 to a cooler 122 where the lean gas is further cooled to a low temperature, e.g., about 75°-125° F. by indirect heat exchange with cooling water introduced through line 124. The gas is removed from heat exchanger 122 through line 126, compressed in blower 128 and returned through line 130 to the vapor space beneath tray 92 where it mingles with the desorbed lean product from the fractionation sub-zone 18 and enters the cooling zone 14 by counter-current flow through the downcomers 132 of tray 92.

The preferentially adsorbed component on the adsorbent which enters the hot stripping zone 12 is removed with the lift gas as a purge gas stream that is removed through conduit 44. This combined stream of lift gas and purged gas is compressed by blower 134 and divided into the lift gas stream which passes through conduit 84 into the lift induction zone 30 and a purge gas stream that is passed through conduit 136 into indirect heat exchange in heat exchanger 110 with a portion of the recycle rich gas used to heat the solids in the thermal desorbtion zone 22. The purge gas stream is removed from heat exchanger 110 through conduit 138 and passed through water cooler 140 in indirect heat exchange with cooling water introduced through line 142 at a rate sufficient to effect cooling of this stream to near ambient temperature, e.g., 75°-150° F. The cooled purge gas stream is removed from cooler 140 through conduit 143 and is combined with the feed gas introduced into the adsorbtion tower 10 through conduit 88.

The following example will illustrate the application of the invention to a selective adsorption process.

EXAMPLE

An adsorption process is designed to process 50,011,000 standard cubic feet per hour of a feed gas comprising a mixture of hydrogen, carbon monoxide and methane. The feed gas is available at a temperature of 50° F. and 950 psig. The adsorption process is to produce a lean gas stream comprising 40,104,000 standard cubic feet per hour of a mixture of hydrogen and carbon monoxide at a pressure of 947 psig and a temperature of 100° F. The rich gas produced by the plant comprises 9,906,000 standard cubic feet per hour of methane containing less than 0.1 percent carbon monoxide at a temperature of 135° F. and a pressure of 952 psig.

The plant is formed of four adsorption vessels similar in construction to vessel 10 of FIG. 1 which are in parallel flow, each receiving one-quarter of the total feed gas of the plant. The vessels are 12.5 feet internal diameter and have an overall height of 110 feet. Activated carbon is circulated through each vessel at a circulation rate of 1000 tons per hour for a total plant circulation of 4,000 tons per hour. The plant has one direct-fired heater, element 112 of FIG. 1, having a capacity of 200 million BTU's per hour. The cooling water flow through the coolers 122 and 140 comprises 5500 gallons per minute. Three low differential pressure blowers are employed having a total theoretical power requirement of 2,400 horse power.

The composition of the feed gas and the flow rate of the respective components thereof are set forth in the following TABLE:

TABLE 1

| Design Feed Compositions and Conditions | | | |
|---|---|---|---|
| Component | Mols/Hr. | Mol % | Lb/Hr |
| Hydrogen | 109,252 | 77.85 | 220,252 |
| Methane | 27,595 | 19.3 | 442,624 |
| Ethane | Trace | — | — |
| Carbon Monoxide | 2,460 | 1.72 | 68,905 |
| Carbon Dioxide | 283 | .198 | 12,455 |
| TOTALS | 139,590 | 99.068 | 744,236 |

The composition of the lean gas product removed from the vessels through line 24 is set forth in the following TABLE:

TABLE 2

| Product Composition | | | |
|---|---|---|---|
| Component | Mols/Hr | Mol % | Lb/Hr |
| Hydrogen | 109,252 | 97.79 | 220,252 |
| Carbon Monoxide | 2,460 | 2.21 | 68,905 |
| Methane | LESS THAN 0.1% | | |
| TOTALS | 111,712 | 100.00 | 289,157 |

The rich gas product comprising methane with less than 0.1 percent carbon monoxide is removed through line 100 from the adsorption vessels at a flow rate of 27,595 mols per hour (442,624 pounds per hour).

The purge gas which is passed through line 136 comprises a mixture of methane, carbon monoxide and hydrogen in the proportions set forth in TABLE 3.

TABLE 3

| PURGE GAS STREAM | | |
|---|---|---|
| Component | Mols/Hr | Mol % |
| Methane | 27,595 | 39.5 |
| Carbon Monoxide | 914 | 1.3 |
| Hydrogen | 41,393 | 59.2 |
| TOTALS | 69,902 | 100.0 |

The recycle lean gas stream removed through line 116 that is cooled and recycled to the cooling through line 117, shown in FIG. 1, has the composition set forth in the following TABLE:

TABLE 4

| HYDROGEN - CARBON MONOXIDE COOLING AND RECYCLING STREAM | | | |
|---|---|---|---|
| Component | Mols/Hr | Mol % | Lb./Hr |
| Hydrogen | 251,164 | 97.90 | 506,347 |
| Carbon Monoxide | 5,388 | 2.10 | 150,918 |
| TOTALS | 256,552 | 100.00 | 657,265 |

Methane is withdrawn through line 104 at a rate of 232,459 mols per hour. The methane stream is heated to a temperature of 613° F. and introduced into the thermal desorption zone. The methane is removed from the zone at a temperature of 135° F.

The lift gas which is passed through line 84 to the lift induction zone 30 is of the same composition as the purge gas stream set forth in TABLE 3. The flow rate of the lift gas stream is 140,876 mols per hour. The lift gas is removed from the top of vessel 10 at a temperature of 600° F.

The direct fired heater used in the process receives the methane at a temperature of 537° F. from the heat exchangers 108 and 110. This heater is designed for a heat release of 201,993,276 BTU's per hour to raise the temperature of the methane stream to 613° F.

The heat exchanger 108 is designed to receive on its shell side, the flow of 256,552 mols per hour of the cooling gas of the composition set forth in TABLE 4 from a temperature of 550° to 160° F. The tube side of the exchanger is designed to heat a flow of 176,390 mols per hour of methane from the inlet temperature of 135° to an exit temperature of 525° F.

The heat exchanger 110 is designed with a shell side to cool a quantity of 69,902 mols per hour of the purge gas stream having the composition set forth in TABLE 3 from an inlet temperature of 600° to an exit temperature of 160° F. The tube side of the heat exchanger is designed to heat a total flow of 56,069 mols per hour of methane from a temperature of 135° to 575° F.

The water cooler 122 is designed with a shell side for a flow rate of cooling water of 4286 gallons per minute at an inlet temperature of 85° and an exit temperature of 135°. The tube side of the heat exchanger is designed to cool the flow of 256,552 mols per hour of the cooling gas stream having the composition of TABLE 4 from a temperature of 160° to an outlet temperature of 100° F.

The cooler 140 is designed to receive a flow rate of 1305 gallons per minute of cooling water at an inlet temperature of 85° and an outlet temperature of 135° F. The tube side of the cooler 140 is designed to cool a flow rate of 69,902 mols per hour of the purge gas stream having the composition set forth in TABLE 3 from an inlet temperature of 160° to an outlet temperature of 100° F.

The blower 134 is designed to compress a total flow of 210,778 mols per hour of the purge and lift gas mixture having the composition set forth in TABLE 3 to a differential pressure of 6 psi. The flow rate through the blower at inlet conditions is 738 cubic feet per second and the power requirements are 1,160 horsepower.

The recycle rich gas used in the thermal desorption unit is compressed in blower 106 and this blower is designed to handle a flow of 232,459 mols per hour of methane (456 cubic feet per second at inlet conditions) at a temperature of 135° and compress the gas a differential pressure of 5 psi. The power requirements are 596 horsepower.

The blower 128 used to compress the cool lean gas recycle stream is designed for a flow rate of 256,552 mols per hour of the stream having the composition set forth in TABLE 4, corresponding to 474 cubic feet per second at inlet conditions. The blower compresses the mixture a differential pressure of 5 pounds per square inch and the power requirements are 630 horsepower.

The adsorption vessels used in the process are designed for a maximum operating pressure of 1,000 psig at a maximum temperature of 650° F. The total quantity of activated carbon adsorbent employed in the process is 1,400,000 pounds.

Referring now to FIG. 2, there is illustrated a graphical design for the calculation of the number of stages required for the removal of the residual methane components on the thermally desorbed activated carbon used in the process. FIG. 2 comprises a plot of the vapor composition which exists in equilibrium with the indicated weight percentage of methane adsorbed on carbon resulting in the curved line 150. The operating line 152 is applied to the equilibrium diagram of FIG. 2. The operating line is designed to intercept the base line of FIG. 2 at a value of 0.1 weight percent methane on the carbon. This line is plotted on FIG. 2 while maintaining a sufficient vertical separation from the equilibrium curve to obtain an optimum number of equivalent stages of separation for the hot stripping zone 12. The line extends to the value of 7.5 weight percent methane on carbon which corresponds to the residual weight percent of methane that remains on the thermally desorbed activated carbon. As shown in FIG. 2, the slope of the operating line 152 is chosen to provide a total of 5 theoretical stages of stripping for the stripper section. This line could be drawn at a steeper slope, closer to the equilibrium curve, thus reducing the reflux ratio and requiring a lesser quantity of stripping gas, it would require a greater number of equivalent separation stages. Since each equivalent separation stage corresponds to a bed depth of from 1 to 2 feet in vessel 10, it is desirable to minimize the number of stages. In the illustrated example, a total of 5 theoretical stages is employed resulting in a bed depth of the stripping zone of 10 feet.

Another important benefit of the use of the high temperature stripper, in addition to the reduced solid circulation rate is the reduction of utilities for the entire plant operation. Only a moderate temperature need be used in the heating section at the base of the column and a substantial amount of the stripping load is carried by the multi-stage high temperature stripper zone 12. In this case, the load is divided with half of the adsorbed methane being desorbed at the base of the column in the thermal desorbtion zone 22 and the other half being removed in the high temperature stripping zone 12.

Referring now to FIG. 3, there is illustrated an alternative variation in the adsorbtion vessel which is useful in providing an optimum point of introduction of the recycle purge gas. As apparent from a comparison of TABLES 1 and 3, the purge gas has a composition that is considerably different from the composition of feed, namely the purge gas contains a substantial greater concentration of methane than does the feed gas. The optimum point for introduction of this purge gas into the adsorption vessel 10 is, therefore, below the tray 90 used for introduction of the feed gas. The optimum point of introduction of the gas would be at the location in the fractionation zone 20 where the gas is in equilibrium with the solids at a composition that closely approximates the composition of the gas being introduced. In this case, a supplemental gas introduction tray 91 is located a distance below the feed gas introduction tray 90 at a location where the equilibrium gas composition approximates that of the purge gas composition set forth in TABLE 4.

The adsorption process of the invention has a direct application for effecting the separation of gaseous mixtures which are difficult to separate by cryogenic techniques. Another difficult gas separation, other than that set forth in the preferred example, comprises the separation of carbon monoxide and nitrogen using activated carbon which has a slight preference for the carbon monoxide. The separation can be effected using an equivalent of approximately 100 stages or trays in the fractionation zone, corresponding to a fractionation depth from 100 to about 125 feet and the equivalent of 50 trays or separation stages in the hot stripping zone, equivalent to a bed depth of from 50 to about 60 feet.

The adsorption process of the invention has the advantage of substantially lesser capital investment than required by cryogenic processes and the magnitude of this advantage is increasing currently because of the rapidly escalating costs of the precision high pressure equipment, electric motors and turbines and the like which are required for cryogenic separation. Although the adsorption processes such as described in my prior patents suffer relatively low thermal efficiencies, the present invention substantially increases the thermal efficiency of the adsorption process to a point where the process of the invention has distinct advantages over cryogenic separations, particularly for effecting the separation of gaseous mixtures which are difficult to separate by such techniques.

The invention has been described with reference to the illustrated and presently preferred embodiments thereof. It is not intended that the invention be unduly restricted by this description of the presently preferred embodiments. Instead, it is intended that the invention be defined by the means, and their obvious equivalents, set forth in the following claims.

What is claimed is:

1. In a process for separation of a gaseous feed mixture of at least two components including a more preferentially adsorbed component and a less preferentially adsorbed component wherein a moving, compact, unfluidized bed of particulate adsorbent is passed through a plurality of gas contacting zones including, in successive order:

(1) a cooling zone wherein hot particulate adsorbent is contacted with cool gas and is cooled thereby,
 (2) a fractionation zone wherein the cooled particulate adsorbent is contacted with the said gaseous mixture and forms a rich adsorbate enriched in the more preferentially adsorbed component and a lean gas concentrated in the less preferentially adsorbed component that flows countercurrent thereto and that is removed as a lean gas product from the upper portion of said fractionation zone;
 (3) a heating zone wherein said rich adsorbate is contacted with hot recycle gas to desorb its more preferentially adsorbed gaseous component that is removed from the upper portion of said heating zone as a rich gas product enriched in the more preferentially adsorbed component, the improvement of which comprises:

(a) passing hot, thermally desorbed, particulate adsorbent from said heating zone through a hot stripping zone and contacting said adsorbent therein with a countercurrent flow of said lean gas with a sufficient flow of said lean gas and sufficient depth of said stripping zone to effect substantially complete desorption of the more preferentially adsorbed gaseous component therefrom;

(b) removing, from said hot stripping zone, a purge gas mixture of said more and less preferentially adsorbed gaseous components;

(c) cooling the removed purge gas mixture by indirect heat exchange with said hot recycle gas prior to contacting with said rich adsorbent;

(d) recycling the cooled purge gas mixture by introducing said purge gas mixture into said fractionating zone;

(e) introducing said lean gas product into said cooling zone as said cool gas and removing a hot lean gas from said cooling zone; and (f) cooling said hot lean gas by indirect heat exchange with said recycle rich gas prior to its introduction into said heating zone.

2. The process of claim 1 wherein said purge gas mixture is introduced into said fractionating zone in admixture with said gaseous feed mixture.

3. The process of claim 1 wherein said purge gas mixture is introduced into said fractionating zone at a location thereof where the gaseous mixture therein has substantially the same proportions of gas components as said purge gas mixture.

4. The process of claim 1 wherein said hot stripping zone has a depth equivalent to 3 to about 20 stages.

5. The process of claim 1 wherein said fractionating zone has a depth equivalent to 5 to about 50 stages.

6. The process of claim 1 wherein said hot stripping zone is the uppermost zone of a compact moving bed and including the steps of removing hot adsorbent from said heating zone and transporting said hot adsorbent to said hot stripping zone.

7. The process of claim 6 wherein said transporting is effected by feeding said hot adsorbent into a lift zone, contacting said hot adsorbent therein with a lift gas to vertically lift said adsorbent through said lift zone.

8. The process of claim 7 wherein said lift gas and adsorbent are discharged from said lift zone into said hot stripping zone.

9. The process of claim 8 wherein said lift gas is removed from said hot stripping zone in admixture with said purge gas mixture, said purge gas mixture is compressed and divided into two streams, one stream being introduced as lift gas in said lift zone and the other stream recycled as said purge gas mixture to said fractionating zone.

10. The process of claim 9 wherein said recycled stream of purge gas mixture is cooled by indirect heat exchange with recycle rich gas to heat said recycle rich gas prior to its introduction into said heating zone.

11. The process of claim 10 wherein hot lean gas is removed from the upper portion of the cooling zone, and is cooled and recycled thereto as said cool lean gas.

12. The process of claim 11 wherein said hot lean gas is cooled by indirect heat exchange with said recycle rich gas to heat said recycle rich gas prior to its introduction into said heating zone.

* * * * *

UNITED STATES PATENT AND TRADEMARK OFFICE
CERTIFICATE OF CORRECTION

PATENT NO. : 4,306,886
DATED : December 22, 1981
INVENTOR(S) : Clyde Berg

It is certified that error appears in the above—identified patent and that said Letters Patent is hereby corrected as shown below:

On the title page, Item [76] "Berg Clyde" should read
--- Clyde Berg ---.
Column 7, line 30, ".7.5" should read --- 7.5 ---.

Signed and Sealed this

Eighteenth Day of May 1982

[SEAL]

Attest:

Attesting Officer

GERALD J. MOSSINGHOFF

Commissioner of Patents and Trademarks